3,231,398
ROOT-PROOF AND ROOT-REPELLANT, BITUMINOUS JOINTING AND SEALING COMPOUNDS
Otto Pauli, Krefeld-Bockum, Germany, assignor to Farbenfabriken Bayer Aktiengesellschaft, Leverkusen, Germany, a corporation of Germany
No Drawing. Filed Nov. 2, 1962, Ser. No. 235,105
6 Claims. (Cl. 106—16)

This invention relates to root-proof and root-repellant joint sealing compounds and insulations. More particularly it relates to joint sealing compounds and insulations which are based on various bituminous materials and which are characterized by a content of material which makes them root-proof and root-repellant.

Various types of bituminous materials are known. Among them, asphalts which are found naturally in lakes and other occurrences from which they must be mined, for example, gilsonite, glance pitch and grahamite, are suitable for the purpose of this invention. Furthermore, also the bituminous materials, for example coal tar pitch, which are obtained from residues derived from the distillation of coal, shale or other organic materials, can be used. Especially suitable as asphalts or bituminous materials derived from petroleum hydrocarbons, which are obtained, for example, in the form of more or less fluid residues in the distillation of the petroleum crude oils, after the volatile fractions have been removed, or the residues obtained by distillation of the heavy residual oils resulting from breaking down under heat and pressure of petroleum distillates.

Other suitable bituminous materials are the products obtained by oxidizing the heretofore mentioned materials by blowing them with oxygen-containing gases, especially air, at elevated temperatures.

It is also possible to use mixtures of two or more of the above mentioned materials. The bituminous materials can also be used in admixture with inorganic and/or organic filling materials, for example, asbestos, mica, stone powder, cork meal and rubber.

The above mentioned bituminous materials are frequently used as joint sealing compounds and insulations for various purposes with good results. A special problem, however, arises when such bituminous materials are used in connection with certain subterranian applications, for example, as joint sealing compounds and insulations for subterraneously laid pipe-lines, masonry and for road-surfaces.

It is known that plant roots, in particular tree roots, in their search for water frequently penetrate water pipes and in particular sewerage pipes and wells and, thus, jointing and sealing compounds in such pipe lines are penetrated with amazing force. It occurs that the penetrating roots often cause blockages of sewerage pipes. Such damage is mainly known in bituminous jointing and sealing compounds.

It is furthermore known that bituminous insulations of pipe-lines are frequently damaged by roots. This causes the metallic corrosion of iron pipes.

Attempts have not been lacking to overcome these disadvantages of bituminous jointings and insulations and to make such material root-proof or even root-repellant. The hitherto customary effective substances for these purposes, such as napthol or pentachlorophenol, have, however, the disadvantages of being very volatile at the working temperatures customary for bituminous material, or they protect such material only in relatively high doses against the penetration of roots. The use of such chemicals is, therefore, connected with a considerable uncertainty or with great expense.

It has now been found that root-proof and root-repellant joint sealing compounds and insulations based on bituminous and asphaltic materials, which are especially suitable for subterraneously laid pipe-lines and masonry and for road-surfaces can be obtained by using bituminous materials with a content of herbicides which are difficult to volatilize, not noticeable soluble in water and compatible with said bituminous materials.

Examples of herbicidal compounds according to the basic principle of the present invention are the esters and the amides derived from 2,4-dichloro-phenoxy-acetic-acid, 2,4-dichloro-phenoxy-propionic-acid, 2,4-dichloro-phenoxy-butyric-acid, 2,4,5-trichloro-phenoxy-acetic-acid, 2,4,5-trichloro-phenoxy-propionic-acid, 2-methyl-4-chloro-phenoxy-acetic-acid, 2-methyl-4-chloro-phenoxy-propionic-acid and alpha-naphthyl-acetic-acid and from polyvalent alcohols or amines.

Suitable polyvalent alcohols are, for example, ethylene glycol, propane-diol-1,2, propane-diol-1,3, butane-diol-1,4, pentane-diol-1,5, hexane-diol-1,6, diethylene-glycol, triethylene glycol, the polyether-alcohols obtained by polymerizing ethyleneoxide and propyleneoxide, glycerol, trimethylolpropane, pentaerythritol and sorbitol.

Suitable polyamines are, for example, ethylene diamine, N,N'-dimethylethylene diamine, diethylene triamine and hexamethylene diamine-1,6.

Especially suitabe herbicides of the above mentioned ester- and amide-types are, for example, ethylene glycol-bis-(2,4-dichloro-phenoxy-acetic-acid)-ester, glycerol-tris-(2,4-dichloro-phenoxy-acetic-acid)-ester, diethylene glycol-bis-(2,4,5-trichloro-phenoxy-acetic-acid)-ester, triethylene glycol-bis-(2-methyl-4-chloro-phenoxy-acetic-acid)-ester, trimethylolpropane-bis-(2-methyl-4-chloro-phenoxy-propionic-acid)-ester, esters of the above mentioned acids with polyethylene glycols and polypropylene glycols with molecular weights between about 200 and about 2000, bis-(2,4-dichloro-phenoxy-acetic-acid)-ethylene diamide and bis-(2,4,5-trichloro-phenoxy-acetic-acid)-1,6-hexamethylene diamide.

The above mentioned herbicides can be produced in known manner, for example, by heating the free acids or the acid-chlorides with the polyalcohols or the polyamines. They are viscous oils or waxy or crystalline materials, thus, for example, the reaction product of 82 parts by weight of 2,4,5-trichloro-phenoxy-acetic-acid and 13.4 parts by weight of trimethylol-propane being a viscous oil of the specific weight of 1.48 and a saponification number of about 180, the reaction product from 90 parts by weight of 2-methyl-4-chloro-phenoxy-propionic-acid and 80 parts by weight of a polyethylene glycol with an average molecular weight of 400 being a viscous oil of a specific weight of 1.19 and a saponification number of 135.

The above-named herbicides have a surprisingly strong effect so that generally a good protection is already achieved with small quantities. In some cases additions of between approximately 0.1 and approximately 0.3 percent are sufficient although larger quantities, as for example, up to 5 percent of the above-mentioned herbicides, can be added to the joint sealing compounds and insulations.

The addition of the above-named substances to such compounds has the surprising effect that the roots of the plants, in particular tree and bush roots, change their direction of growth at some distance from the compounds, generally before they come into closer contact with the compounds containing the effective substance. This occurs without the roots and thus the plants themselves become diseased or dying. If, however, some root tips should penetrate into the surface of the sealing compounds or into the compounds themselves, then these roots die off already in the upper layers of the compounds.

The jointings, sealing compounds and insulations according to the present invention can be used for the most various purposes. Apart from the subterraneously laid pipe-lines mentioned above, other applications are, for instance, pipe-lines of any kind or masonry in contact with the ground or set in the ground, road-surfaces and such like.

The invention is illustrated in the following examples.

*Example 1*

75.3 parts by weight of a bituminous material which is obtained by blowing a residue from the petroleum crude oil distillation with air at a temperature of about 180° C. and having a softening point (ring and ball method) of about 80° C., 10 parts by weight of a coal tar pitch obtained as a residue from the distillation of coal tar and having a softening point (ring and ball method) of about 100° C., and 14 parts by weight of milled vulcanized natural rubber are admixed with 0.7 part by weight of 2,4,5-trichloro-phenoxy-acetic-acid-butylene glycol-(1,4)-ester. Jointings in a subterraneously laid pipe-line prepared from said mixture are completely effective against ingrowing roots even when the jointings are made from a mixture which was repeatedly heated to about 160–180° C.

*Example 2*

Several samples of a bituminous material obtained by blowing a residue from the petroleum crude oil distillation with air at a temperature of about 200° C. and having a softening point (ring and ball method) of about 85° C. are admixed with the various herbicides given in the following table in various amounts. Test plates obtained from the resulting mixture with a thickness of 10 mm. were tested in lime-lean soil with a pH value of 5–6 and a certain content of peat against the growth of lupine-roots (*Lupinus albus*) during 8 weeks. The following table shows the number of the roots which have penetrated the test plates and the maximum degree of penetration observed in 3 simultaneous tests.

I claim:
1. A root-proof and root-repellant composition suitable for joint sealings and insulations for pipe lines, masonry and road surfaces in contact with earth, said composition comprising a bituminous material and from 0.1 to 5% by weight of a herbicide selected from the group consisting of
   (a) an ester of an acid selected from the group consisting of 2,4-dichloro-phenoxy-acetic-acid, 2,4-dichloro-phenoxy-propionic-acid, 2,4 - dichloro - phenoxy-butyric-acid, 2,4,5 - trichloro - phenoxy-acetic-acid, 2,4,5-trichlorophenoxy-propionic-acid, 2-methyl-4-chloro-phenoxy-acetic-acid, 2-methyl-4-chloro-phenoxy-propionic-acid and alpha-naphthyl-acetic-acid, and an alcohol of the group consisting of ethylene glycol; propane - diol - 1,2; propane - diol - 1,3; butane - diol - 1,4; pentane - diol - 1,5; hexane - diol-1,6; diethylene glycol; triethylene glycol; glycerol; trimethylol-propane; pentaerythritol; sorbitol and polyethylene glycol and polypropylene glycol with molecular weights between about 200 and about 2000 and
   (b) an amide of an acid of the aforesaid group and an amine selected from the group consisting of ethylene diamine, N,N'-dimethylethylene diamine, diethylene triamine and hexamethylene diamine-1,6.

2. The composition of claim 1 wherein said herbicide is 2,4,5-trichloro-phenoxy-acetic-acid-butylene glycol-(1,4)-ester.

3. The composition of claim 1 wherein said herbicide is trimethylolpropane - tris-2,4,5-trichloro-phenoxy-acetic-acid-ester.

4. The composition of claim 1 wherein said herbicide is the bis-ester of polyethylene glycol with a molecular weight of 200 and 2-methyl-4-chloro-phenoxy-propionic-acid.

5. The composition of claim 1 wherein said herbicide is the bis-ester of polyethylene glycol with a molecular weight of 400 and 2-methyl-4-chloro-phenoxy-propionic-acid.

6. The composition of claim 1 wherein said herbicide is the bis-amide from 1 mol of N,N'-dimethyldiamine and 2 mol of 2-methyl-4-chloro-phenoxy-propionic-acid.

| Herbicide | Content, percent by weight | Number of roots which have penetrated | Maximum degree of penetration, mm. |
|---|---|---|---|
| Trimethylolpropane-tris-2,4,5-trichloro-phenoxy-acetic-acid-ester | 0.6 | 16 | 1–3 |
| Bis-ester of polyethylene glycol with a molecular weight of 200 and 2-methyl-4-chloro-phenoxy-propionic-acid | 0.3 | 18 | 1–3 |
| Do | 0.4 | 16 | 0.5–1 |
| Bis-ester of polyethylene glycol with a molecular weight of 400 and 2-methyl-4-chloro-phenoxy-propionic-acid | 0.4 | 22 | 1–4 |
| Do | 0.55 | 12 | 0.5–1 |
| Bis-amide from 1 mol N,N'-dimethylethylene diamine and 2 mol 2-methyl-4-chloro-phenoxy-propionic-acid | 0.6 | 10 | 1–2 |

References Cited by the Examiner
UNITED STATES PATENTS
2,738,287  3/1956  Eisenhut _____ 106—284
FOREIGN PATENTS
1,089,103  9/1960  Germany.

ALEXANDER H. BRODMERKEL, *Primary Examiner.*
MORRIS LIEBMAN, *Examiner.*